(12) United States Patent
Shiraishi

(10) Patent No.: US 7,605,963 B2
(45) Date of Patent: Oct. 20, 2009

(54) OPTICAL BEAM SCANNING APPARATUS, OPTICAL BEAM SCANNING METHOD AND IMAGE FORMING APPARATUS

(75) Inventor: Takashi Shiraishi, Kanagawa-Ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/207,360

(22) Filed: Sep. 9, 2008

(65) Prior Publication Data
US 2009/0067021 A1   Mar. 12, 2009

Related U.S. Application Data

(60) Provisional application No. 60/971,538, filed on Sep. 11, 2007.

(51) Int. Cl.
*G02B 26/08* (2006.01)
(52) U.S. Cl. .................................. 359/205.1
(58) Field of Classification Search ............. 359/205.1, 359/206.1, 216.1; 347/232, 243, 258–261; 250/234–236
See application file for complete search history.

(56) References Cited

U.S. PATENT DOCUMENTS 7,088,485 B2 *  8/2006  Suzuki ............... 359/216.1
7,277,212 B2 * 10/2007  Miyatake et al. ...... 359/205.1

FOREIGN PATENT DOCUMENTS

| JP | 63-273814 | 11/1988 |
| JP | 63-274263 | 11/1988 |
| JP | 4-51110 | 2/1992 |
| JP | 11-218991 | 8/1999 |

* cited by examiner

*Primary Examiner*—Euncha P Cherry
(74) *Attorney, Agent, or Firm*—Patterson & Sheridan, LLP

(57) ABSTRACT

An optical beam scanning apparatus according to the present invention includes a light source, a pre-deflection optical system, a light deflecting device, a post-deflection optical system, a first sensor configured to detect a part of the luminous fluxes deflected by the light deflecting device, one or plural first optical elements configured to be provided in the post-deflection optical system and act on the luminous fluxes deflected by all the deflection surfaces of the light deflecting device; and a second optical element having positive power in the sub-scanning direction configured to be provided in an optical path between any one of the first optical elements and the first sensor and act on the luminous fluxes deflected by all the deflection surfaces of the light deflecting device.

19 Claims, 5 Drawing Sheets

OPTICAL BEAM SCANNING APPARATUS, OPTICAL BEAM SCANNING METHOD AND IMAGE FORMING APPARATUS

CROSS-REFERENCE TO RELATED APPLICATIONS

This application is based upon and claims the benefit of priority from: U.S. provisional application 60/971,538, filed on Sep. 11, 2007, the entire contents of which is incorporated herein by reference.

TECHNICAL FIELD

The present invention relates to an optical beam scanning apparatus, an optical beam scanning method and an image forming apparatus including the optical beam scanning apparatus. In particular, the invention relates to an optical beam scanning apparatus that can form plural scanning lines by separating one or plural luminous fluxes, which are emitted from one or plural light sources, in a sub-scanning direction for each of color components using deflection surfaces of a deflecting device and then, imaging the luminous fluxes by a post-deflection optical system and an image forming apparatus including the optical beam scanning apparatus.

BACKGROUND

In an image forming apparatuses of an electrophotographic system such as a laser printer, a digital copying machine, or a laser facsimile includes an optical beam scanning apparatus that forms an electrostatic latent image on a photoconductive drum by irradiating a laser beam (a luminous flux) on the surface of a photoconductive drum and scanning the laser beam.

Recently, besides a monochrome machine including a scanning optical system that uses a single light source, a tandem color machine is proposed. For the tandem color machine, a method of increasing the number of laser beams scanned at a time by providing plural light sources (laser diodes) in one laser unit (a multi-beam method) is proposed for the purpose of realizing an increase in speed of scanning on the surface of a photoconductive drum. In the multi-beam method, plural beams for each of color components (e.g., yellow, magenta, cyan, and black) emitted from the respective light sources are subjected to processing in a pre-deflection optical system and are changed to one beam and made incident on a polygon mirror. The beam deflected by the polygon mirror is, after passing through an fθ lens configuring a post-deflection optical system, separated into beams for each of the color components and irradiated on a photoconductive drum for each of the color components.

There is also proposed a color image forming apparatus including an optical beam scanning apparatus that forms plural scanning lines by separating one or plural luminous fluxes, which are emitted from one or plural light sources, for each of color components using plural deflection surfaces having different angles with respect to a rotation center axis of a deflecting device (a polygon mirror) and then, imaging the luminous fluxes by a post-deflection optical system. This optical beam scanning apparatus determines timing for drawing an image in a main scanning direction on photoconductive drums by detecting timing of beams irradiated on the respective photoconductive drums with use of a horizontal synchronizing sensor. Several methods are known as a method of guiding luminous fluxes to the horizontal synchronizing sensor.

For example, according to a technique proposed in JP-A-11-218991, a horizontal synchronizing sensor provided in an optical path of a beam for black can detect only the beam for black and, without detecting beams for other colors, draw an image on photoconductive drums after predetermined time subsequent to the detection of the beam for black. According to a technique proposed in JP-A-63-274263, it is possible to guide beams of plural scanning lines to one horizontal synchronizing sensor through an optical fiber and then, set a signal time width of a horizontal synchronizing signal for each of the scanning lines. According to a technique proposed in JP-A-63-273814, it is possible to guide beams of plural scanning lines to one horizontal synchronizing sensor through an optical fiber or guide beams of scanning lines to one horizontal synchronizing sensor by changing an angle of a reflection mirror that guides the beams to the horizontal synchronizing sensor.

In the technique proposed in JP-A-11-218991, theoretically, it is possible to adjust phases of laser beams of the respective colors by detecting the beam for black. However, in a situation in which there is an error in accuracy of angles of deflection surfaces of a deflecting device and an error can occur in rotating speed of the deflecting device, it is difficult to appropriately adjust phases of laser beams of the respective colors by detecting only the beam for black. In the technique proposed in JP-A-63-274263, it is necessary to make plural beams incident on the optical fiber. In order to make the plural beams sufficiently incident on the optical fiber, it is necessary to provide an adjusting mechanism for adjusting a position of the optical fiber. In the technique proposed in JP-A-63-274263, even if the plural beams are made incident on the optical fiber, it is impossible to discriminate on which of deflecting surfaces the beams are deflected.

Moreover, in the technique proposed in JP-A-63-273814, besides using the optical fiber, it is possible to adjust phases of laser beams of the respective colors by changing an angle of the reflection mirror. However, it is difficult to sufficiently adjust the phases of the laser beams of the respective colors.

In this way, in a color image forming apparatus including an optical beam scanning apparatus that separates one or plural luminous fluxes, which are emitted from one or plural light sources, for each of color components using plural deflection surfaces having different angles with respect to a rotation center axis of a deflecting device (a polygon mirror) and then, images the luminous fluxes by a post-deflection optical system, it is impossible to appropriately adjust phases of laser beams of respective colors. As a result, not only color drift occurs but also distortion occurs in an image of a single color.

SUMMARY

The present invention was devised in view of such circumstances and it is an object of the present invention to provide an optical beam scanning apparatus that can easily and suitably adjust phases of laser beams of respective colors, an optical beam scanning method and an image forming apparatus including the optical beam scanning apparatus.

In order to solve the problems, an optical beam scanning apparatus according to an aspect of the present invention includes a light source configured to emit one or plural luminous fluxes, a pre-deflection optical system configured to shapes the luminous fluxes emitted from the light source to image the luminous fluxes as a line image in a direction corresponding to a main scanning direction, a light deflecting device configured to separate the luminous fluxes imaged by the pre-deflection optical system in a sub-scanning direction for each of color components using plural deflection surfaces having different angles with respect to a rotation center axis and scan the luminous fluxes against a scanning object in the main scanning direction, a post-deflection optical system configured to image the luminous fluxes deflected by the light deflecting device on the scanning object, a first sensor configured to detect a part of the luminous fluxes deflected by the light deflecting device, one or plural first optical elements configured to be provided in the post-deflection optical system and act on the luminous fluxes deflected by all the deflection surfaces of the light deflecting device, and a second optical element having positive power in the sub-scanning direction configured to be provided in an optical path between any one of the first optical elements and the first sensor and act on the luminous fluxes deflected by all the deflection surfaces of the light deflecting device.

In order to solves the problems, an optical beam scanning method according to another aspect of the present invention includes the steps of preparing an optical beam scanning apparatus including a light deflecting device, a first sensor, one or plural first optical elements and a second optical element, emitting one or plural luminous fluxes, forming the luminous fluxes emitted from the light source to image the luminous fluxes as a line image in a direction corresponding to a main scanning direction, separating the luminous fluxes in a sub-scanning direction for each of color components using plural deflection surfaces having different angles with respect to a rotation center axis and scanning the luminous fluxes against a scanning object in the main scanning direction, by the light deflecting device, detecting, by the first sensor, a part of the luminous fluxes deflected by the light deflecting device, acting on the luminous fluxes deflected by all the deflection surfaces of the light deflecting device, by the first optical element provided in the post-deflection optical system, and acting on the luminous fluxes deflected by all the deflection surfaces of the light deflecting device, by the second optical element having positive power in the sub-scanning direction provided in an optical path between any one of the first optical elements and the first sensor.

In order to solves the problems, an image forming apparatus according to another aspect of the present invention is an image forming apparatus including an optical beam scanning apparatus, the optical beam scanning apparatus including a light source configured to emit one or plural luminous fluxes, a pre-deflection optical system configured to form the luminous fluxes emitted from the light source to image the luminous fluxes as a line image in a direction corresponding to a main scanning direction, a light deflecting device configured to separate the luminous fluxes imaged by the pre-deflection optical system in a sub-scanning direction for each of color components using plural deflection surfaces having different angles with respect to a rotation center axis and scan the luminous fluxes against a scanning object in the main scanning direction, a post-deflection optical system configured to image the luminous fluxes deflected by the light deflecting device on the scanning object, a first sensor configured to detect a part of the luminous fluxes deflected by the light deflecting device, one or plural first optical elements configured to be provided in the post-deflection optical system and act on the luminous fluxes deflected by all the deflection surfaces of the light deflecting device, and a second optical element having positive power in the sub-scanning direction configured to be provided in an optical path between any one of the first optical elements and the first sensor and act on the luminous fluxes deflected by all the deflection surfaces of the light deflecting device.

In order to solve the problems described above, an optical beam scanning apparatus according to still another aspect of the present invention includes a light source configured to emit one or plural luminous fluxes, a pre-deflection optical system configured to form the luminous fluxes emitted from the light source to image the luminous fluxes as a line image in a direction corresponding to a main scanning direction, a light deflecting device configured to separate the luminous fluxes imaged by the pre-deflection optical system in a sub-scanning direction for each of color components using plural deflection surfaces having different angles with respect to a rotation center axis and scan the luminous fluxes against a scanning object in the main scanning direction, a post-deflection optical system configured to image the luminous fluxes deflected by the light deflecting device, a first sensor configured to detect a part of the luminous fluxes deflected by the light deflecting device, and a first optical element having positive power in the sub-scanning direction configured to be provided in an optical path between the light deflecting device and the first sensor and act on the luminous fluxes deflected by all the deflection surfaces provided in the light deflecting device.

In order to solves the problems, an optical beam scanning method according to another aspect of the present invention includes steps of preparing an optical beam scanning apparatus including a light deflecting device, a first sensor and a first optical elements, emitting one or plural luminous fluxes, forming the luminous fluxes emitted from the light source to image the luminous fluxes as a line image in a direction corresponding to a main scanning direction, separating the luminous fluxes in a sub-scanning direction for each of color components using plural deflection surfaces having different angles with respect to a rotation center axis and scanning the luminous fluxes against a scanning object in the main scanning direction, by the light deflecting device, detecting, by the first sensor, a part of the luminous fluxes deflected by the light deflecting device, acting on the luminous fluxes deflected by all the deflection surfaces of the light deflecting device, by the first optical element having positive power in the sub-scanning direction provided in an optical path between the light deflecting device and the first sensor.

In order to solves the problems, an image forming apparatus according to another aspect of the present invention is an image forming apparatus including an optical beam scanning apparatus, the optical beam scanning apparatus including a light source configured to emit one or plural luminous fluxes, a pre-deflection optical system configured to form the luminous fluxes emitted from the light source to image the luminous fluxes as a line image in a direction corresponding to a main scanning direction, a light deflecting device configured to separate the luminous fluxes imaged by the pre-deflection optical system in a sub-scanning direction for each of color components using plural deflection surfaces having different angles with respect to a rotation center axis and scan the luminous fluxes against a scanning object in the main scanning direction, a post-deflection optical system configured to image the luminous fluxes deflected by the light deflecting device, a first sensor configured to detect a part of the luminous fluxes deflected by the light deflecting device, and a first optical element having positive power in the sub-scanning direction configured to be provided in an optical path between the light deflecting device and the first sensor and act on the luminous fluxes deflected by all the deflection surfaces provided in the light deflecting device.

DESCRIPTION OF THE DRAWINGS

In the accompanying drawings.

DETAILED DESCRIPTION

An embodiment of the present invention is explained below with reference to the accompanying drawings.

Figure 1:
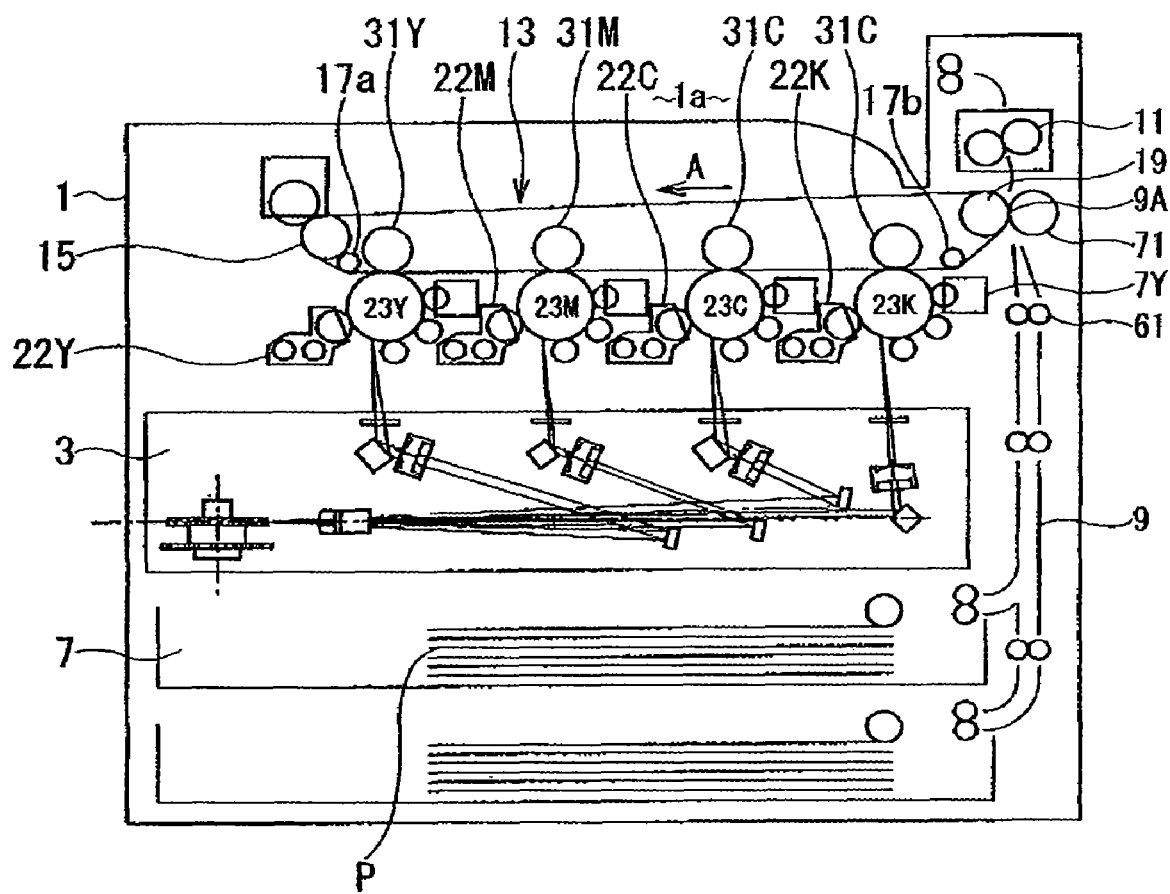
FIG. 1 is a side view showing a configuration of an image forming apparatus having an optical beam scanning apparatus to which the present invention is applied.

FIG. 1 is a diagram showing a configuration of an image forming apparatus 1 having an optical beam scanning apparatus 3 according to an embodiment of the present invention. In the explanation of this embodiment, the image forming apparatus 1 is applied to a color printer. However, the application of the image forming apparatus 1 is not limited to this. The image forming apparatus 1 can also be applied to various image output apparatuses such as a full-color copying apparatus, a facsimile apparatus, and a workstation apparatus.

The image forming apparatus 1 includes the optical beam scanning apparatus (an exposing apparatus) 3 that generates image light corresponding to an image signal and an image forming unit that transfers a toner image visualized by a toner as a developer onto sheet-like paper P as a transfer medium used for output, which is called hard copy or printout, on the basis of the image light supplied by the optical beam scanning apparatus 3 and outputs the toner image. Every time the toner image is formed, the paper P is fed to the image forming unit from a paper holding unit 7 that holds an arbitrary number of sheet-like pieces of paper P having a predetermined size and can feed the pieces of paper P one by one according timing when the toner image is formed in the image forming unit.

A conveying path 9 that guides the paper P from the paper holding unit 7 to the image forming unit is provided between the paper holding unit 7 and the image forming unit. The conveying path 9 guides the paper P to a fixing device 11 that fixes, on the paper P, the toner image transferred onto the paper P through a transfer device 9A that transfers the toner image formed in the image forming apparatus. As another function, the conveying path 9 guides the paper P having the toner image fixed thereon by the fixing device 11 to an image-output holding unit 1a also serving as a part of a cover that covers the image forming unit.

The image forming unit has an intermediate transfer belt 13 obtained by forming an insulative film having predetermined thickness in an endless belt shape. A belt obtained by forming metal in a thin sheet shape and then, protecting the surface thereof with resin may be applied as the intermediate transfer belt 13. Predetermined tension is applied to the intermediate transfer belt 13 by a driving roller 15, a first tension roller 17a and a second tension roller 17b, and a transfer roller 19. An arbitrary position of the intermediate transfer belt 13 parallel to an axis of the driving roller 15 moves in an arrow A direction when the driving roller 15 is rotated. In other words, a belt surface of the intermediate transfer belt 13 turns in one direction at speed of movement of an outer peripheral surface of the driving roller 15.

First to fourth image forming units 21Y, 21M, 21C, and 21K are arrayed at predetermined intervals in a section in which the belt surface of the intermediate transfer belt 13 moves substantially flat with the predetermined tension applied thereto by the respective rollers (the driving roller 15, the first tension roller 17a and the second tension roller 17b, and the transfer roller 19).

The first to fourth image forming units 21Y, 21M, 21C, and 21K respectively include at least developing devices 22Y, 22M, 22C, and 22K in which toners of arbitrary colors of Y (yellow), M (magenta), C (cyan), and BK (black) are stored and photoconductive drums 23Y, 23M, 23C, and 23K that hold electrostatic latent images developed by the respective developing devices 22 (the developing devices 22Y, 22M, 22C, and 22K). Electrostatic latent images corresponding to images of colors developed by the developing devices 22Y, 22M, 22C, and 22K provided in the respective image forming units 21 are formed, by image light from the optical light scanning apparatus 3, on the surfaces (outer peripheral surfaces) of the photoconductive drums 23Y, 23M, 23C, and 23K included in the respective image forming units 21. Consequently, the toners are selectively supplied by any one of the developing devices 22Y, 22M, 22C, and 22K corresponding to the electrostatic latent images. As a result, toner images of predetermined colors are formed on the photoconductive drums 23Y, 23M, 23C, and 23K, respectively.

In the first to fourth image forming units 21Y, 21M, 21C, and 21K, transfer rollers 31Y, 31M, 31C, and 31K for transferring the toner images held by the respective photoconductive drums 23 onto the intermediate transfer belt 13 are respectively provided in positions opposed to the photoconductive drums 23Y, 23M, 23C, and 23K via the intermediate transfer belt 13. The transfer rollers 31Y, 31M, 31C, and 31K are provided on a rear side of the intermediate transfer belt 13.

A not-shown image-signal supplying unit is provided in the image forming apparatus 1 in which the developing devices 22 (22Y, 22M, 22C, and 22K), the photoconductive drums 23 (23Y, 23M, 23C, and 23K), and the transfer roller 31 (31Y, 31M, 31C, and 31K) are arrayed as described above. The image-signal supplying unit supplies an image signal for each of color components to the optical beam scanning apparatus 3. The optical beam scanning apparatus 3 generates image light corresponding to the image signal supplied from the image-signal supplying unit and irradiates the generated image light on the surfaces of the photoconductive drums 23 (23Y, 23M, 23C, and 23K) integral with the developing devices 22 (22Y, 22M, 22C, and 22K) that holds the toners of the color components corresponding to the image light. At this point, the respective image forming units 21 forms electrostatic latent images at predetermined timing such that the sequentially-transferred toner images are superimposed one on top of another on the intermediate transfer belt 13. The electrostatic latent images are developed (visualized) by the developing devices 22 corresponding to the image forming units 21.

The toner images formed on the photoconductive drums 23 of the respective image forming units 21 are transferred onto the intermediate transfer belt 13 by the transfer rollers 31 (31Y, 31M, 31C, and 31K) as primary transfer devices corresponding to the respective photoconductive drums 23 (23Y, 23M, 23C, and 23K). At this point, the toner images of Y, M, C, and BK are sequentially stacked on the intermediate transfer belt 13 that moves at predetermined speed. In the case of FIG. 1, roller bodies are used as the transfer rollers 31 which are primary transfer devices. However, the transfer rollers 31 are not limited to the roller bodies and may be voltage generating devices such as scorotrons.

A secondary transfer roller 71 as a secondary transfer device is provided in the image forming apparatus 1. The secondary transfer roller 71 comes into contact with the intermediate transfer belt 13 at predetermined pressure in a transfer position 9A of the conveying path 9. The secondary transfer roller 71 as the secondary transfer device transfers a full-color toner image formed on the intermediate transfer belt 13 onto the paper P guided to the transfer position 9A of the conveying path 9.

Registration rollers 61 that temporarily stop the paper P, which is guided from the paper holding unit 7 to the transfer position 9A, is provided in a predetermined position in the conveying path 9 between the paper holding unit 7 to the transfer position 9A. The registration rollers 61 include two rollers. At least one roller rotates in a predetermined direction and the other roller is pressed against one roller at predetermined pressure via a not-shown press-contact mechanism.

The paper P is guided through the conveying path 9 from the paper holding unit 7 to the transfer position 9A and temporarily stopped by the registration rollers 61. This makes it possible to correct a tilt (a tilt of the paper P with respect to a conveying direction) that can occur during conveyance through the conveying path 9 from the paper holding unit 7 to the transfer position 9A.

According to timing when the registration roller 61 is rotated again, timing when a toner image carried to the transfer position 9A according to the movement of the belt surface of the intermediate transfer belt 13 reaches the transfer position 9A and timing when the paper P reaches the transfer position 9A are set. This makes it possible to arbitrarily set a position of the toner image with respect to the paper P and manage the position of the toner image with respect to the paper P.

Figures 2A, 2B, 2C:
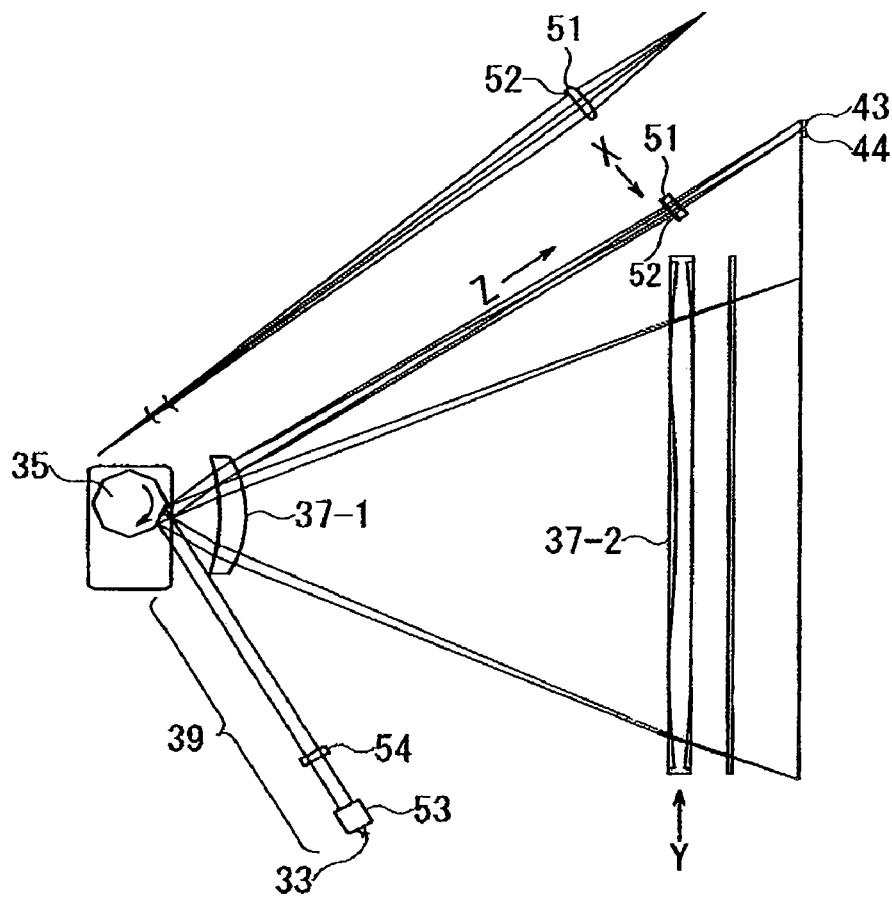
FIGS. 2A to 2C are diagrams showing expansion of reflecting by a reflection mirror provided in the optical beam scanning apparatus.

FIGS. 2A to 2C are diagrams showing expansion of reflecting by the reflection mirror provided in the optical beam scanning apparatus 3. FIG. 2A is a diagram which views FIG. 2B from an arrow X direction. FIG. 2C is a diagram which views FIG. 2B from an arrow Y direction. The optical beam scanning apparatus 3 includes, as shown in FIGS. 2A to 2C, at least a light source (a semiconductor laser) 33 that outputs image light (exposure light), a deflecting device 35 that scans the image light from the light source 33 in a raster direction for output (hard copy or printout) and guides a beam to the respective photoconductive drums 23 arranged at predetermined intervals in the sub-scanning direction, a post-deflection optical system (an image forming optical system) 37 that focuses the image light, which is raster-deflected (scanned) by the deflecting device 35, on the photoconductive drums 23 (23Y, 23M, 23C, and 23K) of the first to fourth image forming units 21 under a predetermined condition regardless of a deflection angle, and a pre-deflection optical system (an exposure light shaping optical system) 39 that guides the image light from the light source 33 to the deflecting device 35 under a predetermined condition.

A direction in which respective laser beams are deflected (scanned) by the deflecting device 35 (a rotation axis direction of the photoconductive drums 23) is defined as "main scanning direction" and a direction perpendicular to the optical axis of the optical system and the main scanning direction is defined as "sub-scanning direction". Therefore, the sub-scanning direction is a drum rotating direction on the photoconductive drum 23.

The deflecting device 35 includes a polygon mirror main body (a so-called polygon mirror) in which, for example, eight plane reflection surfaces (plane reflection mirrors) are arranged in a regular polygonal shape and a motor that rotates the polygon mirror main body in the main scanning direction at predetermined speed. The polygon mirror main body is a rotatable reflection element and fixed to a shaft of the motor. The number of reflection surfaces provided in the polygon mirror main body as the reflection element and the number of revolutions are set according to requirements of output (i.e., resolution and output speed required of the image forming apparatus 1 and other requirements) The reflection surfaces (polygon mirror surfaces) of the deflecting device 35 have required angles with respect to a rotation center axis of the polygon mirror main body such that a beam can be guided to a scanning line position where electrostatic latent images are formed on the respective photoconductive drums 23.

The post-deflection optical system 37 includes at least a shared lens 37-1 used for all scanning lines for forming electrostatic latent images of the respective colors guided to the respective photoconductive drums 23 and an individual lens 37 corresponding to each of the scanning lines for forming electrostatic images of the respective colors guided to the respective photoconductive drums 23. Different light focusing properties are given to the shared lens 37-1 according to positions in a longitudinal direction of the respective photoconductive drums 23Y, 23M, 23C, and 23K (i.e., positions on the photoconductive drums 23 that depend on swing angles (deflection angles) of image light caused by raster-scanning of the deflecting device 35 in the main scanning direction orthogonal to a direction in which the paper P is conveyed (a direction in which the photoconductive drums 23 are rotated). The shared lens 37-1 has a slender shape extending in the longitudinal direction of the photoconductive drums 23.

The post-deflection optical system 37 includes, besides the shared lens 37-1 and the individual lens 37-2, various optical elements (e.g., a mirror and a filter) for guiding the image light raster-scanned by the deflecting device 35 to the respective photoconductive drums 23Y, 23M, 23C, and 23K of the first to fourth image forming units 21. The shared lens 37-1 and the individual lens 37-2 may be replaced with mirrors having curved surfaces similar to those of these lenses by optimizing types and shapes of optical elements and combining arrays. The replacement with mirrors may be applied to both the shared lens 37-1 and the individual lens 37-2 or may be applied to only one of the lenses.

A focus position (a focus position on a front side in the sub-scanning direction) of the shared lens 37-1 is set further on an upstream side (a side where the rotation center axis of the polygon mirror main body is present; the upstream side may extend beyond the rotation center axis) than the reflection surface (the polygon mirror surface) of the deflecting device 35 such that an inter-beam distance of beams emitted from the shared lens 37-1 for generating electrostatic latent images of the respective colors increases toward downstream of the optical paths.

The pre-deflection optical system 39 forms the image light from the light source 33 such that the image light is formed in (condensed in) a sectional beam shape that satisfies a predetermined condition when the image light is raster-scanned by the deflecting device 35 and focused in predetermined positions in the longitudinal direction of the respective photoconductive drums 23Y, 23M, 23C, and 23K in the post-deflection optical system 37. The pre-deflection optical system 39 includes optical elements such as a condenser lens, a mirror, and an aperture.

Predetermined intervals corresponding to positions where the respective image forming units 21 are arrayed (substantially equal intervals on the belt surface of the intermediate transfer belt 13) are given to the image light emitted from the optical beam scanning apparatus 3. Intervals of the image light emitted from the optical beam scanning apparatus 3 are defined to integer times as large as a circumference (a rotation pitch of the driving roller 15) obtained by adding up the diameter of the driving roller 15 and the thickness of the intermediate transfer belt 13. Therefore, even if there is eccentricity or the like in the driving roller 15, since the same period is given when images are formed in the first to fourth image forming units 21, it is possible to reduce the influence of the eccentricity such as color drift.

Figure 3:
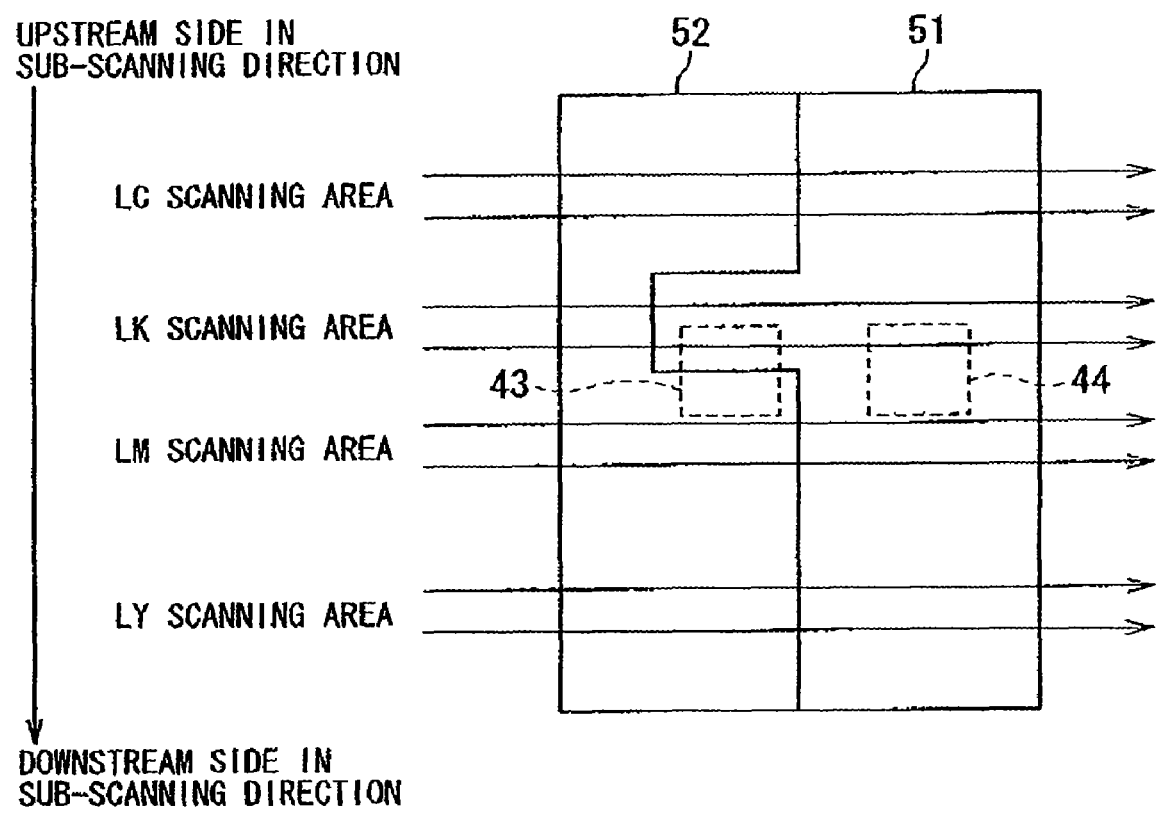
FIG. 3 is an explanatory diagram for explaining a shape of a light blocking plate that blocks optical paths of beams LY, LM, and LC to a surface discrimination sensor arranged on a downstream side of the optical path with respect to optical elements.

The scanning optical system of the optical beam scanning apparatus 3 includes a surface discrimination sensor 43 that outputs a signal only when the beam LK of BK (black) is scanned on the polygon mirror surface and a horizontal synchronizing sensor 44 for determining timing for drawing an image in the main scanning direction. A beam made incident on the horizontal synchronizing sensor 44 passes through the shared lens 37-1 and, then, passes through an optical element 51. The optical element 51 focuses beams passing through the different optical paths on the horizontal synchronizing sensor 44 in the sub-scanning direction while setting heights in the sub-scanning direction of all the optical paths substantially identical on the surface of the horizontal synchronizing sensor 44. The optical element 51 is a convex cylindrical lens on a surface on one side (a surface on the downstream side of the optical paths) thereof in this embodiment. A light blocking plate 52 is arranged on the upstream side of the optical path of the optical element 51. As shown in FIG. 3, the light blocking plate 52 has a shape for blocking the optical path of the beams LY, LM, and LC to the surface discrimination sensor 43 arranged on the downstream side of the optical paths with respect to the optical element 51. The light blocking plate 52 causes only the beam LK to pass through the surface discrimination sensor 43 via the optical element 51 In this embodiment, as shown in FIG. 3, the four beams LY, LM, LC, and LK emitted from the shared lens 37-1 after being deflected by the deflecting device 35 are arrayed in order of the beams LC, LK, LM, and LY from the upstream side in the sub-scanning direction to the downstream side in the sub-scanning direction. However, the array of the beams LC, LK, LM, and LY is not limited to this. The beams LC, LK, LM, and LY may be arrayed in order of the beams LY, LM, LK, and LC from the upstream side in the sub-scanning direction to the downstream side in the sub-scanning direction.

On the other hand, the light blocking plate 52 causes all the beams LY, LM, LC, and LK to pass through, via the optical element 51, the horizontal synchronizing sensor 44 arranged on the downstream side of the optical paths with respect to the optical element 51. This makes it possible to suitably adjust, while discriminating the black laser beam among the laser beams of the respective colors guided from the deflecting device 35 via the optical element 51, phases of the laser beams of the respective colors for each of the laser beams. Further, it is possible to prevent occurrence of color drift even in a situation in which there is an error in accuracy of an angle of the deflection surface of the deflecting device 35 and in which an error is likely to occur in rotating speed of the deflecting device 35. Moreover, it is possible to prevent occurrence of distortion in an image of a single color.

It goes without saying that the light blocking plate 52 may cause any one of the beams LY, LM, and LC to pass through the surface discrimination sensor 43 rather than causing only the beam LK to pass through the surface discrimination sensor 43. In this embodiment, the optical element 51 is provided in the optical paths between the optical element 37-1 that acts on the luminous fluxes deflected by all the deflection surfaces of the deflecting device 35 and the horizontal synchronizing sensor 44. However, the optical element 51 may be provided in the optical paths between the deflecting device 35 and the horizontal synchronizing sensor 44.

Figure 4F:
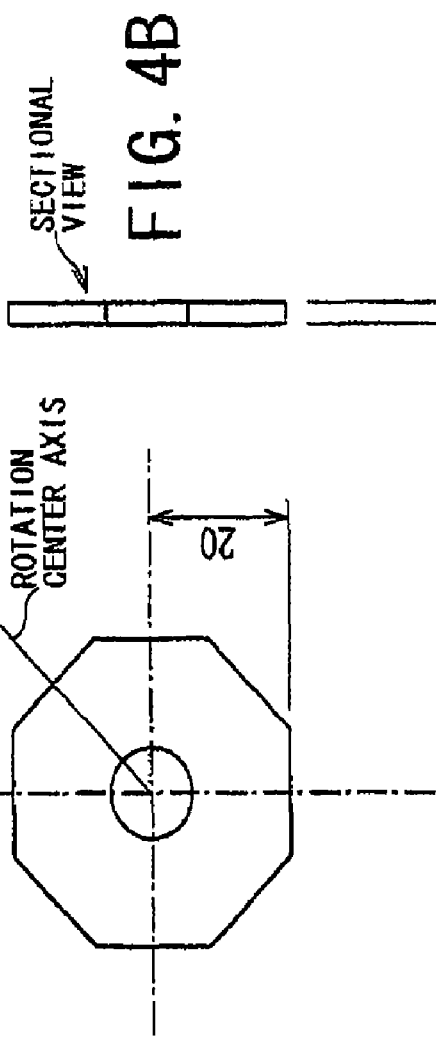
FIGS. 4A to 4F are a plan view, a sectional view, and side view of a polygon mirror main body of a deflecting device used in a scanning optical system of the optical beam scanning apparatus.
Figure 4B:
Figure 4A:
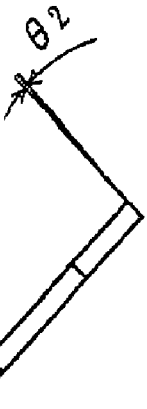
Figure 4E:
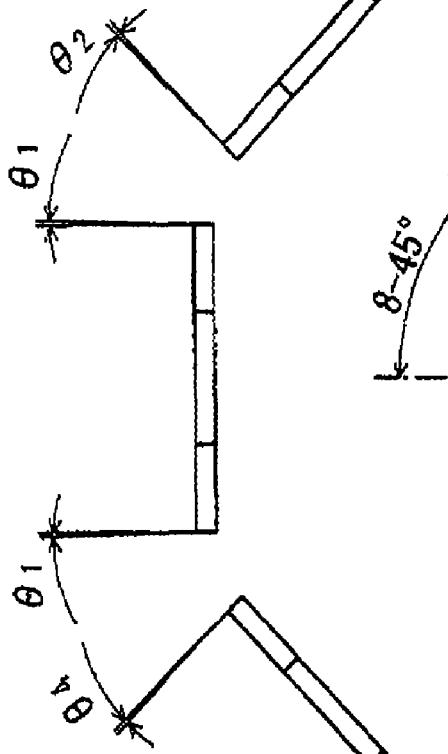
Figure 4D:
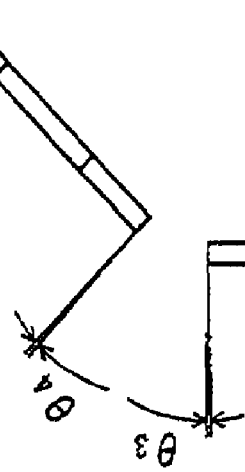
Figure 4C:
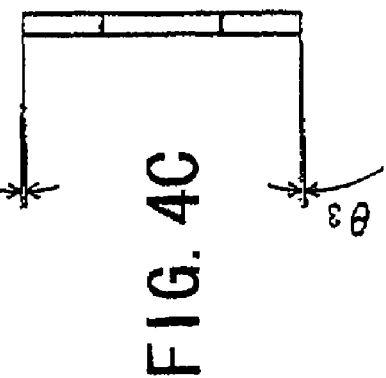

FIGS. 4A to 4F are a plan view, a sectional view, and side view of the polygon mirror main body of the deflecting device 35 used in the scanning optical system of the optical beam scanning apparatus 3. FIG. 4A is a plan view of the polygon mirror main body of the deflecting device 35. FIG. 4B is a sectional view of the polygon mirror main body of the deflecting device 35. FIGS. 4C to 4F are sides views of the polygon mirror main body of the deflecting device 35 viewed from a predetermined direction.

Figure 5:
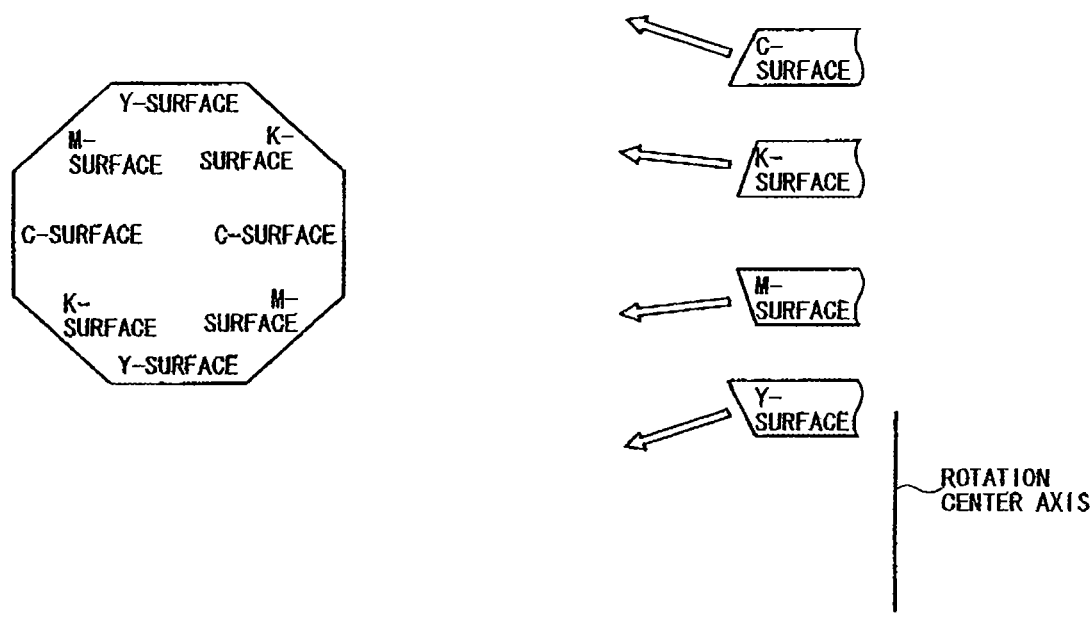
FIG. 5 is a diagram showing a state in which a reflection surface (Y surface) of the polygon mirror that reflects beams LY, LM, LC, and LK tilts in a direction for approaching a rotation axis direction.

The sectional view of the polygon mirror main body of the deflecting device 35 shown in FIG. 4B shows a reference surface in setting a tilt of the reflection surfaces of the polygon mirror main body. A motor is provided on an A side of the reference surface via a not-shown shaft. As shown in FIGS. 4C to 4F, the reflection surfaces of the polygon mirror main body (the polygon mirror) have required tilts with respect to the rotation center axis (a rotation center axis of the motor, in other words, a hole center axis of the polygon mirror main body). Absolute values of the tilts of the reflection surfaces are maximum and equal at $\theta_1$ and $\theta_3$ and signs of the tilts are set opposite. The tilts have a relation of $\theta_1 = -\theta_3$ have a relation of $\theta_1 > \theta_2 > \theta_4 > \theta_3$ or $\theta_1 < \theta_2 < \theta_4 < \theta_3$. For example, when a value of $\theta$ is a minus numerical value, this means that the reflection surface tilts in a direction closer to a rotation axis direction as the reflection surface is further away from the reference surface A. When a value of $\theta$ is a plus numerical value, this means that the reflection surface tilts in the direction closer to the rotation axis direction as the reflection surface is further away from a surface on the opposite side of the reference surface A. Specifically, for example, as shown in FIG. 5, the reflection surface (a C surface) that reflects the beam LC of the color component C and the reflection surface (K surface) that reflects the beam LK of the color component K tilt in the direction closer to the rotation axis direction as the reflection surfaces are further away from the surface on the reference surface A. The reflection surface (M surface) that reflects the beam LM of the color component M and the reflection surface (Y surface) that reflects the beam LY of the color component Y tilt in the direction away from the rotation axis direction as the reflection surfaces are further away from the reference surface A.

By arranging the reflection surfaces in this way, it is possible to control a maximum value of a tilt angle of the reflection surfaces of the polygon mirror main body to be as small as possible compared with other those in other arrangements. Since deterioration in a focusing characteristic increases as the tilts of the reflection surfaces of the polygon mirror main body increase, it is possible to suitably control the deterioration in the focusing characteristic.

Figure 6:
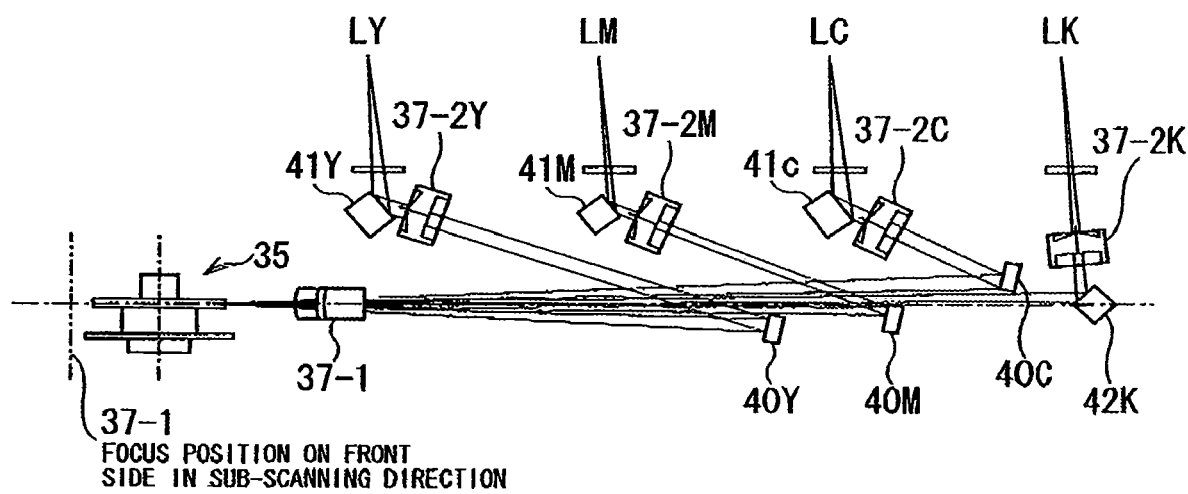
FIG. 6 is a diagram showing a detailed configuration of the optical beam scanning apparatus shown in FIG. 1.

In FIG. 6, optical paths for guiding beams to the respective photoconductive drums 23Y, 23M, 23C, and 23K using two reflection mirrors 40 and 41 for the three colors of Y, M, and C and using one reflection mirror 42 for one color of BK are shown. As described above, the focus position (the focus position on the front side in the sub-scanning direction) of the shared lens 37-1 is set further on the upstream side (the side where the rotation center axis of the polygon mirror main body is present; the upstream side may extend beyond the rotation center axis) than the reflection surface (the polygon mirror surface) of the deflecting device 35 such that an inter-beam distance of beams emitted from the shared lens 37-1 for generating electrostatic latent images of the respective colors increases toward downstream of the optical paths. Consequently, beams further on the upstream side of the optical paths in reflection mirrors 40Y, 40M, 40C, and 42K for separating, for each of the color components, the beams raster-deflected by the deflecting device 35 have wider intervals in the same position in a beam traveling direction. The four reflection mirrors are arranged in order of the reflection mirrors 40Y, 40M, 40C, and 42K in order from the upstream side. The intervals in the same position in the beam traveling direction are in a relation of LY-LM>LM-LK>LK-LC.

In optical paths of beams reflected by the sets of the two reflection mirrors 40 and 41, individual lenses 37-2 (37-2Y, 37-2M, and 37-2C) are arranged between the sets of the two reflection mirrors 40 and 41, respectively. On the other hand, in an optical path of a beam reflected by the one reflection mirror 42K, an individual lens 37-2K is arranged after the reflection mirror 42K is arranged. In this embodiment, the beams LC and LY are beams at both the ends in the sub-scanning direction. The beam LY at one end in the sub-scanning direction is reflected by the reflection mirror 40Y on the most upstream side. The beam LC at the other end in the sub-scanning direction is reflected by the reflection mirror 40C second from the most downstream side. The reflection mirror 40C is chamfered in advance not to block the optical path of the beam L.

In this embodiment, in the optical beam scanning apparatus 3 explicitly described above, the individual lens 37-2 (37-2Y, 37-2M, 37-2C, or 37-2K) as an individual imaging lens is provided in the post-deflection optical system 37 for each of the color components. However, the present invention can also be applied to the optical beam scanning apparatus 3 in which all imaging lenses provided in the post-deflection optical system 37 are shared lenses.

What is claimed is:

1. An optical beam scanning apparatus comprising:
    a light source configured to emit one or plural luminous fluxes;
    a pre-deflection optical system configured to shapes the luminous fluxes emitted from the light source to image the luminous fluxes as a line image in a direction corresponding to a main scanning direction;
    a light deflecting device configured to separate the luminous fluxes imaged by the pre-deflection optical system in a sub-scanning direction for each of color components using plural deflection surfaces having different angles with respect to a rotation center axis and scan the luminous fluxes against a scanning object in the main scanning direction;
    a post-deflection optical system configured to image the luminous fluxes deflected by the light deflecting device on the scanning object;
    a first sensor configured to detect a part of the luminous fluxes deflected by the light deflecting device;
    one or plural first optical elements configured to be provided in the post-deflection optical system and act on the luminous fluxes deflected by all the deflection surfaces of the light deflecting device; and
    a second optical element having positive power in the sub-scanning direction configured to be provided in an optical path between any one of first optical elements and the first sensor and act on the luminous fluxes deflected by all the deflection surfaces of the light deflecting device.

2. The optical beam scanning apparatus according to claim 1, wherein plural third optical elements which respectively act on the luminous fluxes deflected by the deflection surfaces provided in the light deflecting device, according to angles with respect to the rotation center axis are further provided in the post-deflection optical system.

3. The optical beam scanning apparatus according to claim 1, wherein the second optical element is a cylindrical lens.

4. The optical beam scanning apparatus according to claim 1, further comprising a second sensor configured to detect a part of the luminous fluxes deflected by any one of the deflection surfaces having a predetermined angle with respect to the rotation center axis.

5. The optical beam scanning apparatus according to claim 4, wherein the second sensor is provided on a downstream side of the optical paths of the second optical element.

6. The optical beam scanning apparatus according to claim 4, further comprising a light blocking member configured to be provided in an optical path between any one of the first optical elements and the second sensor and blocks luminous fluxes other than the luminous fluxes deflected by any one of the deflection surfaces having the predetermined angle with respect to the rotation center axis.

7. The optical beam scanning apparatus according to claim 6, wherein the light blocking member is provided on an upstream side of optical paths of the second optical element.

8. An optical beam scanning method comprising the steps of:
    preparing an optical beam scanning apparatus including a light deflecting device, a first sensor, one or plural first optical elements and a second optical element;
    emitting one or plural luminous fluxes;
    forming the luminous fluxes emitted from the light source to image the luminous fluxes as a line image in a direction corresponding to a main scanning direction;
    separating the luminous fluxes in a sub-scanning direction for each of color components using plural deflection surfaces having different angles with respect to a rotation center axis and scanning the luminous fluxes against a scanning object in the main scanning direction, by the light deflecting device;
    detecting, by the first sensor, a part of the luminous fluxes deflected by the light deflecting device;
    acting on the luminous fluxes deflected by all the deflection surfaces of the light deflecting device, by the first optical element provided in the post-deflection optical system; and
    acting on the luminous fluxes deflected by all the deflection surfaces of the light deflecting device, by the second optical element having positive power in the sub-scanning direction provided in an optical path between any one of the first optical elements and the first sensor.

9. An image forming apparatus including an optical beam scanning apparatus, the optical beam scanning apparatus comprising:
    a light source configured to emit one or plural luminous fluxes;
    a pre-deflection optical system configured to form the luminous fluxes emitted from the light source to image the luminous fluxes as a line image in a direction corresponding to a main scanning direction;

a light deflecting device configured to separate the luminous fluxes imaged by the pre-deflection optical system in a sub-scanning direction for each of color components using plural deflection surfaces having different angles with respect to a rotation center axis and scan the luminous fluxes against a scanning object in the main scanning direction;

a post-deflection optical system configured to image the luminous fluxes deflected by the light deflecting device on the scanning object;

a first sensor configured to detect a part of the luminous fluxes deflected by the light deflecting device;

one or plural first optical elements configured to be provided in the post-deflection optical system and act on the luminous fluxes deflected by all the deflection surfaces of the light deflecting device; and a second optical element having positive power in the sub-scanning direction configured to be provided in an optical path between any one of the first optical elements and the first sensor and act on the luminous fluxes deflected by all the deflection surfaces of the light deflecting device.

10. An optical beam scanning apparatus comprising:
a light source configured to emit one or plural luminous fluxes;
a pre-deflection optical system configured to form the luminous fluxes emitted from the light source to image the luminous fluxes as a line image in a direction corresponding to a main scanning direction;
a light deflecting device configured to separate the luminous fluxes imaged by the pre-deflection optical system in a sub-scanning direction for each of color components using plural deflection surfaces having different angles with respect to a rotation center axis and scan the luminous fluxes against a scanning object in the main scanning direction;
a post-deflection optical system configured to image the luminous fluxes deflected by the light deflecting device;
a first sensor configured to detect a part of the luminous fluxes deflected by the light deflecting device; and
a first optical element having positive power in the sub-scanning direction configured to be provided in an optical path between the light deflecting device and the first sensor and act on the luminous fluxes deflected by all the deflection surfaces provided in the light deflecting device.

11. The optical beam scanning apparatus according to claim 10, wherein one or plural second optical elements configured to act on the luminous fluxes deflected by all the deflection surfaces provided in the light deflecting device are provided in the post-deflection optical system.

12. The optical beam scanning apparatus according to claim 10, wherein plural third optical elements which respectively act on the luminous fluxes deflected by the deflection surfaces provided in the light deflecting device, according to angles with respect to the rotation center axis are further provided in the post-deflection optical system.

13. The optical beam scanning apparatus according to claim 10, wherein the first optical element is a cylindrical lens.

14. The optical beam scanning apparatus according to claim 10, further comprising a second sensor configured to detect a part of the luminous fluxes deflected by any one of the deflection surfaces having a predetermined angle with respect to the rotation center axis.

15. The optical beam scanning apparatus according to claim 14, wherein the second sensor is provided on a downstream side of the optical paths of the first optical element.

16. The optical beam scanning apparatus according to claim 14, wherein
one or plural second optical elements configured to act on the luminous fluxes deflected by all the deflection surfaces provided in the light deflecting device are provided in the post-deflection optical system, and
the optical beam scanning apparatus further includes a light blocking member configured to be provided in an optical path between the second optical element and the second sensor and block luminous fluxes other than the luminous fluxes deflected by any one of the deflection surfaces having the predetermined angle with respect to the rotation center axis.

17. The optical beam scanning apparatus according to claim 16, wherein the light blocking member is provided on an upstream side of optical paths of the first optical element.

18. An optical beam scanning method comprising the steps of:
preparing an optical beam scanning apparatus including a light deflecting device, a first sensor and a first optical elements;
emitting one or plural luminous fluxes;
forming the luminous fluxes emitted from the light source to image the luminous fluxes as a line image in a direction corresponding to a main scanning direction;
separating the luminous fluxes in a sub-scanning direction for each of color components using plural deflection surfaces having different angles with respect to a rotation center axis and scanning the luminous fluxes against a scanning object in the main scanning direction, by the light deflecting device;
detecting, by the first sensor, a part of the luminous fluxes deflected by the light deflecting device;
acting on the luminous fluxes deflected by all the deflection surfaces of the light deflecting device, by the first optical element having positive power in the sub-scanning direction provided in an optical path between the light deflecting device and the first sensor.

19. An image forming apparatus including an optical beam scanning apparatus, the optical beam scanning apparatus comprising:
a light source configured to emit one or plural luminous fluxes;
a pre-deflection optical system configured to form the luminous fluxes emitted from the light source to image the luminous fluxes as a line image in a direction corresponding to a main scanning direction;
a light deflecting device configured to separate the luminous fluxes imaged by the pre-deflection optical system in a sub-scanning direction for each of color components using plural deflection surfaces having different angles with respect to a rotation center axis and scan the luminous fluxes against a scanning object in the main scanning direction;
a post-deflection optical system configured to image the luminous fluxes deflected by the light deflecting device;
a first sensor configured to detect a part of the luminous fluxes deflected by the light deflecting device; and
a first optical element having positive power in the sub-scanning direction configured to be provided in an optical path between the light deflecting device and the first sensor and act on the luminous fluxes deflected by all the deflection surfaces provided in the light deflecting device.

* * * * *